INVENTOR.
Shohachiro Yamasaki
BY Otto John Munz
ATTORNEY

United States Patent Office 3,479,801
Patented Nov. 25, 1969

3,479,801
ROTARY TRANSMITTING APPARATUS OF
PURIFIED AND HUMIDIFIED AIR
Shohachiro Yamasaki, 18, Saganisonin Monzen, Ohjyoin-
cho, Ukyo-ku, Kyoto, Japan
Filed Dec. 27, 1967, Ser. No. 693,839
Claims priority, application Japan, Oct. 9, 1967,
42/64,887
Int. Cl. B01d 47/02, 47/00
U.S. Cl. 55—232                                    3 Claims

ABSTRACT OF THE DISCLOSURE

An apparatus transmitting purified and humidified air in which a plurality of hollow members are disposed at a fixed distance on a circle intersecting a liquid surface in a container at an oblique angle and fixed so that open ends thereof are rotated around a rotary axis positioned on the substantially equal level to that of the liquid surface, air introduced onto said liquid surface of the container through a filter means is caught by said hollow members, and in turn continuously discharged downwards beneath of a lower open end extending under water of an air exhaust pipe, meanwhile the liquid contained in said container is continuously dropped onto said filter means to purify and humidify the air introduced into said container and to wash contaminating substances stayed on said filter means. If said filter means is so constituted as to rotate together with said hollow bodies on the co-axial circle, contaminating substances remaining on the filter means can be cleaned by the liquid when said filter means is passing through said liquid and the liquid remaining on the filter means drops therefrom, so that effects of purification and humidification of air according to the apparatus of the invention can be improved.

FIELD OF THE INVENTION

The present invention relates to an apparatus permitting introduction therein of a gas such as air to be purified as well as humidified, subsequent transfer of the purified and humidified air efficiently outwardly from the container with minimum power expenditure.

DESCRIPTION OF THE PRIOR ART

Purification and humidification of the contaminated air have been demanded as a means for medical treatment and as a precaution against respiratory diseases, which are caused due to severe contamination and excessive dryness of the atmosphere. Such an apparatus for purification and humidification of air employs a shower, a sprayer and a filter, each of which is provided with an air inlet and a passage with means to circulate air from the outside and expelled by means of a blower. Such types of apparatus are efficient in the treatment of a large amount of air, but are too large and impractical for use in comparatively narrow spaces such as homes, sick-wards and work-rooms.

For humidification of a comparatively smaller amount of air in such narrow spaces, there have been conventionally used methods of generating steams by boiling water and dispersing droplets generated by supersonic wave by means of an electric fan. Either of those methods, however, has defects in that humidification can not be performed without wetting the surroundings and suitable moisture can be controlled only with difficulties. There is a demand for a smaller sized air transmission apparatus which can perform both the purification and the humidification of air. In order to satisfy the demand, such a prior method is known by which compressed air by means of a compression pump is floated as bubbles out of water. That method, however, has other defects unsatisfactory for the humidification and purification of air. It provides humidification and purification of air only for a limited period of time, makes it difficult to control the transmitting of air and causes vibration and violent noises of the compression pump.

SUMMARY OF THE INVENTION

An object of the present invention is to provide a novel air transmitting apparatus performing effective purification and humidification requiring a minimum of power, and avoiding the above-mentioned defects encountered in the conventional apparatus of the kind.

BRIEF DESCRIPTION OF THE DRAWINGS

In the accompanying drawings showing a preferred embodiment of an apparatus for purification and humidification of air of the present invention.

DESCRIPTION OF A PREFERRED EMBODIMENT

Figure 1:
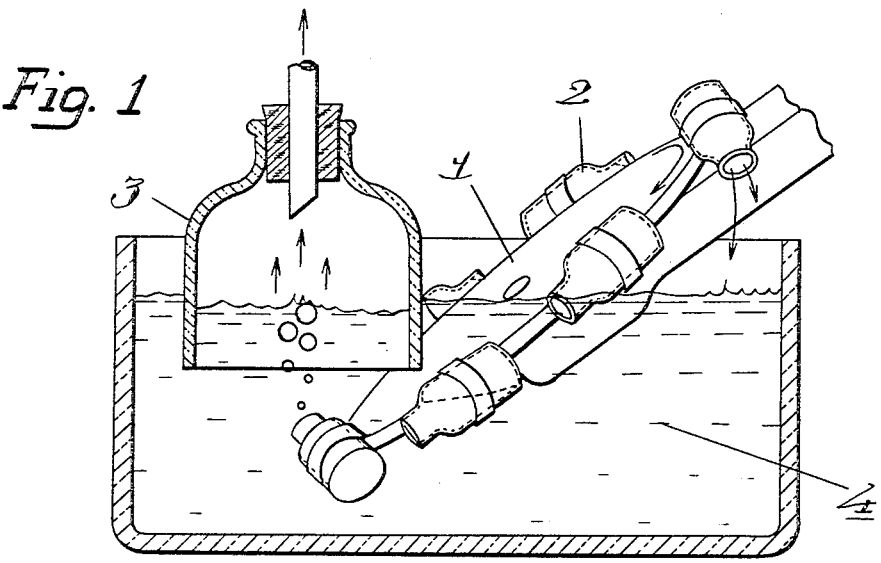
FIG. 1 is an explanatory view partly in perspective showing the principle of the present invention employed in a rotary apparatus for transmission of air.

The operational principle of the apparatus of the present invention, is shown in FIG. 1. A plurality of cups is mounted, spaced from each other around the periphery of a rotatable rotary plate 1 which is positioned for rotation obliquely against the water level in a manner that the lower part thereof may be submerged under water in the container. With water flowing out of the cups air is carried into the water and continuously floats up as bubbles. These are transmitted into the surrounding atmosphere by means of an air collector. According to the present invention, a fixed amount of air can thus be transmitted with small power without employing any type of compression pump, and purification and humidification of transmitting air can be effected to some extent. While the main object of this type of rotary air transmission apparatus is the transmission of air, purification and humidification thereof are rather incidental. Therefore, for a more satisfactory purification and humidification of air additionally an independent heating apparatus is provided for increasing evaporation of water, and a shower and a filter for air purification.

Figure 2:
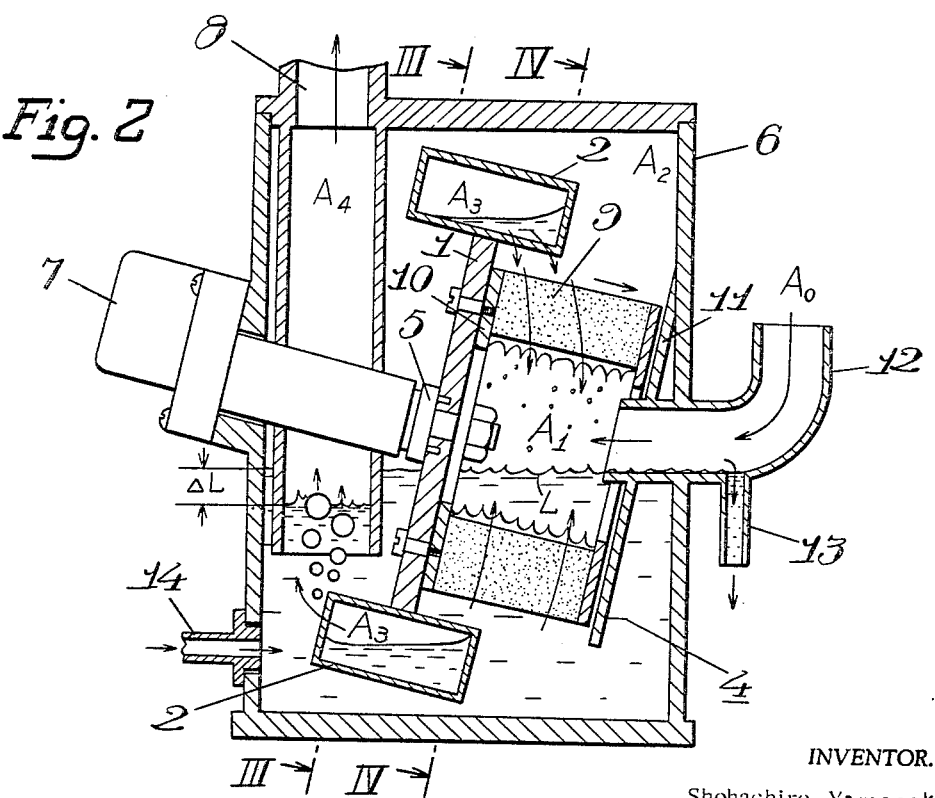
FIG. 2 is a side elevational view showing a modified construction of the same.
Figure 3:
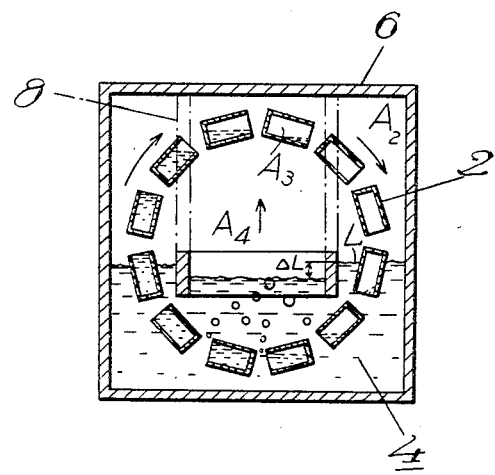
FIG. 3 is a sectional view taken along the line III—III of FIG. 2, which shows particularly a part exhibiting a function of air transmission.
Figure 4:
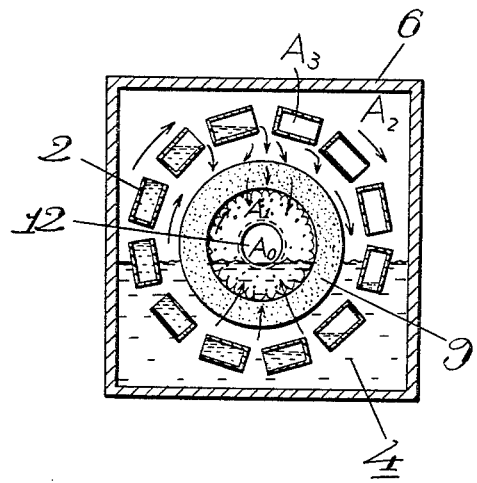
FIG. 4 is a sectional view taken along the line IV—IV of FIG. 2, showing especially a part displaying functions of humidification and purification of the air of the same.

In FIGS. 2–4, a modification of the apparatus is shown as an example of an air transmission apparatus performing effective purification and humidification, without a substantial increase in the size of and power requirements on the apparatus. Provided around the periphery of a rotary plate 1 are cups 2, the opening ends of which are directed to the turning direction, and each of which is disposed at positions of symmetry and at a fixed distance on the periphery of the rotary plate 1. The rotary plate is provided within a sealed container 6 with its rotary axle 5 slightly oblique within said container and rotated by motor 7. Into the sealed container the liquid 4 is poured until the level of the liquid L reaches the central part of the rotary plate 1. As the rotary plate 1 rotates, air from the cups provided around the peripheral edge thereof emerges in a column of bubbles, or in other words, at the upward part above the bottom part of the upwardly facing surface of the rotary plate 1, and bubbles, now floating upward are collected to be transmitted to the outside through an exhaust pipe 8 mounted above the bubbling air column. On the downwardly directed surface a filter 9 is mounted along the periphery thereof as a hollow part $A_1$ on said surface, and a filter ring 10 having an opening communicating with the outside is fixed.

Fixed on the inside wall of said sealed container 6 is a bearer plate of dirty water, which is positioned at the outside of said filter ring through the intermediary of water. An air introducing pipe 12 including a drainpipe 13 is mounted to the opening of the filter ring 10 which is directed outwardly at the position that one part of said air introducing pipe comes in contact with the water level surface L. Said air introducing pipe 12 introduces air into said hollow part $A_1$ of the filter ring 10 and excessive water overflows over the water level L through the drainpipe 13. A water supply pipe 14 is provided at a desired position of the wall of the sealed container, so that fresh water may be supplied.

When the rotary plate 1 is rotated, bubbles floating out of cups 2 passing the lower part of the container 6 are transmitted into the hollow part $A_4$ of the exhaust pipe 8, and at this time the water level within the exhaust pipe 8 becomes lowered by the extent $\Delta L$ in comparison with the normal water level L. Consequently, atmospheric pressure in the hollow part $A_2$ of the container 6 is reduced by the extent $\Delta L$ in comparison with that of the outer atmosphere $A_0$. While rotation of the rotary plate 1 is maintained an air absorbing operation takes place in proportion to exhausted amounts of air. That is, air of the outer atmosphere $A_0$ is introduced through the air introducing pipe 12 and the hollow part $A_1$ of the filter ring 10 into the hollow part $A_2$ of the container. The filter 9 constituting the peripheral wall of the hollow part $A_1$ absorbs water under water as it is rotating and is given impact of dropping water out of the cups 2 now positioned upwards, so that inside the hollow part $A_1$ fine droplets are spread or scattered and rotated, by which water and air are favourably mixed to effect humidification and purification. Air thus purified and humidified is transmitted from the hollow part $A_1$ to the hollow part $A_2$ through the wall of the filter 9 by the absorbing operation of the hollow part $A_2$. In the course of this air transmission, contaminating substances contained in air are caught by the filter 9, and at the same time satisfactorily humidified air is suctioned into the hollow part $A_2$. The air just suctioned into the hollow part $A_2$ as it is being washed with water flowing out of the cups 2 passing the upper part of the container, gets in the part $A_3$ of the cup. The air contained in the part $A_3$ floats as bubbles, when said cup is passing the bottom part and is transmitted to the hollow part $A_4$ of the exhaust pipe 8 communicating with the outer atmosphere. Contaminating substances remaining on the filter 9 are driven into the hollow part $A_1$ with impact of water dropping out of cups 2. Meanwhile, water flowing along the side wall of the filter ring 10 is held in a gap between the bearer plate 11 and the ring, so that the gap is kept air-tight during rotation of the rotary plate 1. Water held in the gap also serves for purification and humidification of air leaking from said gap. When water is supplied into the container from the supply pipe 14 to raise the water surface, with increased water pressure water is let into the hollow part $A_1$ through the lower part of the filter 9 being submerged under the liquid 4, and when water is supplied excessively over the normal water level L, excessive water is discharged through the drainpipe 13.

While water is continuously supplied and the rotary plate 1 continues to rotate, contaminating substances remaining on the filter 9 are continuously washed off and driven into the hollow part of the filter ring 10 with impact of water dropping out of cups positioned upwards and of fresh water which is supplied from the supply pipe and comes through the lower part of the filter positioning under water. Contaminating substances thus washed and driven into the hollow part are collected to be drained off through the drainpipe 13. Accordingly, the filter 9 is constantly kept cleaned and free from clogging and contamination, so that it can always provide effective purification of air. This further eliminates the laborious work of replacement of the filter by a new one.

In the apparatus comprising the hollow filter ring 10 being fixedly secured onto the rotary plate 1, the bearer plate 11 confronting to one side of said filter ring through the intermediary of water and the air introducing pipe 12 provided with the drainpipe 13 at the lower part thereof, two actions are produced by rotation of the rotary plate 1; one is an air absorbing action caused in turn by transmission of air from cups 2 and the other, an action of impact of water given onto the filter surface 9 by water dropping out of said cups. By these air absorbing operation and impact action, air passing through the filter ring 10 is purified and humidified, and in the hollow part $A_1$ air is purified and humidified by mixing with droplets. Meanwhile, contaminating substances caught by the filter ring 10 are washed off to be discharged through the drainpipe 13 with fresh water supplied into the container 6. Thus, the filter constantly effects purification as it is kept cleaned.

All of these elements can be arranged within the comparatively smaller size of sealed container 6. Therefore, it is required to provide neither voluminous containers nor complicated elements. The driving power of the motor is required to be only sufficient to turn the motor to lift the cups containing water and to overcome buoyancy when said cups are put into the water The velocity of its rotation required for transmitting a required amount of air is 15 r.p.m. or less, so that vibrations and noises which have been usually caused by high speed rotation of a motor and compressing operation of air, and frictional resistances are completely eliminated. The amount of air to be transmitted is determined by the volume and number of cups and the velocity of the rotating motor.

Thus by the structures and functions described a predetermined amount of air can be effectively purified and humidified and fully transmitted in smaller sized apparatus.

The apparatus according to the present invention which has such features is suitable for use as means of air purification in various kinds of apparatus and as an apparatus for purification and humidification of air in comparatively narrow spaces such as homes, sick-wards and workrooms. The apparatus is applicable as an instrument of medical treatment which can continuously supply fully humidified and purified air with minimum power requirements; it is especially advantageous to install the apparatus of the invention in sick-wards for respiratory patients.

What is claimed is:

1. A rotary transmitting apparatus of purified and humidified air comprising; a container being constituted air-tightly and being provided with a liquid supply pipe and air filter means, an overflow pipe and an air exhaust pipe, said overflow pipe serving for keeping a level of the liquid in a given level which is supplied into said container through said liquid supply pipe, said air exhaust pipe opening at one end outwardly and at the other end in the liquid; an air introducing pipe opening into said container and transmitting air above said liquid surface; and a driving means rotating to the direction of open ends of a plurality of hollow members, means mounting said plural hollow members at a fixed distance in a manner of directing open ends thereof to one direction on a circle intersecting said liquid surface at an oblique angle, said hollow bodies, as they are kept in rotation, catching the air introduced above said liquid surface and releasing it into said liquid under said open end of said air exhaust pipe which opens under water, while in turn, said hollow members catch the liquid therein and release said liquid above said filter means, thereby transmitting humidified and purified air outwardly from the container through the air exhaust pipe.

2. A rotary transmitting apparatus of purified and humidified air claimed in claim 1 wherein said filter means is mounted coaxially with said circle on a circular supporting means supporting said hollow members and includes a bottom part closed by said supporting means, a top part having an opening communicating with the air introducing pipe and a sleeve wall part extending between said bottom part and said top part and constituted from filtering materials.

3. An air humidifying and purifying apparatus comprising: a horizontally elongated water container with a predetermined water level; a rotary disk mounted on an axial shaft vertically suspended in said container in a plane and on a rotational axis at angles to said water level; said shaft intersecting with said disk at about said water level; a plurality of elongated cups mounted on the periphery of said disk, spaced from each other with their open ends facing the direction of rotation of said disc and with their longitudinal axes in the same plane and parallel to the plane of said disk; an air exhaust pipe mounted vertically in said container with one, its wider the bottom orifice submerged below said level above the lowest point of position of the open ends of the said cups in their circular path of rotation on said disk; whereby during the rotations of said disk, each cup in sequence is filled with water and with air and releases waterand air in their respective positions above and below said water level, and wherein the air released in sequence from said cups bubbles upwards through said water and through said wider lower end of said air vent.

References Cited

UNITED STATES PATENTS

| | | | |
|---|---|---|---|
| 631,002 | 8/1899 | Vriesland | 261—92 X |
| 2,559,164 | 7/1951 | McAllister | 261—92 X |
| 2,687,998 | 8/1954 | McLeary | 261—92 X |
| 3,285,586 | 11/1966 | Powers | 261—92 |

TIM R. MILES, Primary Examiner

U.S. Cl. X.R.

230—108, 113; 261—92, 93